US011829657B1

(12) United States Patent
Wushour

(10) Patent No.: US 11,829,657 B1
(45) Date of Patent: Nov. 28, 2023

(54) SYSTEM AND METHOD FOR PRINTING DEVICE TROUBLESHOOTING AND MAINTENANCE

(71) Applicant: KYOCERA Document Solutions, Inc., Osaka (JP)

(72) Inventor: Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/841,523

(22) Filed: Jun. 15, 2022

(51) Int. Cl.
*G06F 3/12* (2006.01)

(52) U.S. Cl.
CPC ............. *G06F 3/121* (2013.01); *G06F 3/123* (2013.01); *G06F 3/1234* (2013.01); *G06F 3/1261* (2013.01); *G06F 3/1289* (2013.01)

(58) Field of Classification Search
CPC ........ G06F 3/121; G06F 3/123; G06F 3/1234; G06F 3/1261; G06F 3/1289
See application file for complete search history.

(56) References Cited

U.S. PATENT DOCUMENTS

| | | | |
|---|---|---|---|
| 10,674,019 B2 | 6/2020 | Matysiak et al. | |
| 10,686,951 B2 | 6/2020 | Matysiak et al. | |
| 10,719,275 B2 | 7/2020 | Matysiak et al. | |
| 2014/0355049 A1* | 12/2014 | Hadano | G06F 3/1287 358/1.15 |
| 2017/0193461 A1* | 7/2017 | Celinder | G06Q 10/20 |
| 2019/0286379 A1* | 9/2019 | Tojo | G06F 8/65 |
| 2022/0060591 A1* | 2/2022 | Lin | G06N 3/08 |
| 2022/0137897 A1* | 5/2022 | Hattori | G06F 3/1229 358/1.15 |

OTHER PUBLICATIONS

Anomaly detection. Wikipedia. URL: https://en.wikipedia.org/wiki/Anomaly_detection (last edited Jun. 2, 2022; last accessed Jun. 15, 2022).
Bayesian network. Wikipedia. URL: https://en.wikipedia.org/wiki/Bayesian_network (last edited Mar. 9, 2022; last accessed Jun. 15, 2022).

(Continued)

*Primary Examiner* — John R Wallace
(74) *Attorney, Agent, or Firm* — GrowIP Law Group LLC

(57) ABSTRACT

A method for troubleshooting and maintaining printing devices is provided. The method includes identifying, by a service bot in a print device, a maintenance condition to be resolved, wherein the service bot comprises a processor executing instructions stored on a computer-readable medium in the print device; notifying, by the service bot, a client terminal of the maintenance condition and a resolution attempt; analyzing, by the service bot, the maintenance condition using an anomaly detection technique; referencing, by the service bot, a knowledge database to identify a resolution for the analyzed maintenance condition; implementing, by the service bot, the identified resolution at the print device; notifying the client terminal of the identified resolution; and updating the knowledge database with the analyzed maintenance condition and the identified resolution. A non-transitory computer-readable medium and print device are also provided.

16 Claims, 6 Drawing Sheets

(56) References Cited

OTHER PUBLICATIONS

Reliability theory. Encyclopedia of Mathematics. URL: http://encyclopediaofmath.org/index.php?title=Reliability_theory&oldid=48506 (last edited Jun. 6, 2020; last accessed Jun. 15, 2022).

Time until an event occurs, or the lifetime of a device. Vose Software. URL: https://www.vosesoftware.com/riskwiki/Timeuntilaneventoccurs,orthelifetimeofadevice.php (2017) (last accessed Jun. 15, 2022).

\* cited by examiner

SYSTEM AND METHOD FOR PRINTING DEVICE TROUBLESHOOTING AND MAINTENANCE

FIELD

This disclosure relates to the field of printing, and, in particular, to troubleshooting and maintaining printing devices.

BACKGROUND

Many enterprises rely on printing devices, such as Multi-Function Peripherals (MFPs), to perform reliably and consistently. Any downtime due to unexpected print errors can result in lost productivity and interrupted workflows. Therefore, print-error resolution, such as via troubleshooting and maintenance, needs to occur quickly in order to maintain efficiency.

Typical solutions for addressing print errors involve server applications that take interim action while awaiting a human technician to resolve the errors through troubleshooting and maintenance (e.g., fixing an error and/or replacing a part). Such server applications may, for example, hold or restore print jobs, route print jobs, and/or distribute print jobs. However, routing or distributing print jobs to other printing devices may result in print job settings (e.g., media type, color (International Color Consortium (ICC)) profile, booklet/finishing options, etc.) not being properly adjusted according to the target printing device, causing suboptimal or unacceptable print output. This, in turn, may lead to unnecessary waste of time, paper, and ink. In addition, the use of human technicians can be expensive, both in terms of time (such a technician may be located off-site or away from the printing device) and monetary cost (fees paid to the technician, either per job or via a maintenance contract). In addition, the technician may not be qualified or available to resolve a particular print error affecting a particular printing device.

Therefore, an improved system and method for automated troubleshooting and maintenance of a printing device would be desirable.

SUMMARY

One embodiment set forth herein is directed a method for improved printing device maintenance and troubleshooting. The method includes identifying, by a service bot in a print device, a maintenance condition to be resolved, wherein the service bot comprises a processor executing instructions stored on a computer-readable medium in the print device; notifying, by the service bot, a client terminal of the maintenance condition and a resolution attempt; analyzing, by the service bot, the maintenance condition using an anomaly detection technique; referencing, by the service bot, a knowledge database to identify a resolution for the analyzed maintenance condition; implementing, by the service bot, the identified resolution at the print device; notifying the client terminal of the identified resolution; and updating the knowledge database with the analyzed maintenance condition and the identified resolution.

The method, according to another embodiment, may additionally include: receiving, at the print device and from the client terminal, a print job including settings for the print job; printing, by the print device, a first portion of the print job comprising less than an entirety of the print job; identifying, by the service bot, the maintenance condition, wherein the maintenance condition is a printing error that prevents completion of the printing of the entirety of the print job; identifying, by the service bot, at least one physically proximate target print device having printing capabilities suitable to realize the settings included in the print job, wherein the identifying includes the service bot communicating with at least one printer bot respectively associated with the at least one physically proximate target print device to determine the printing capabilities and availability for printing; recreating, by the service bot, the print job to include a second portion of the print job comprising a remainder of the print job not included in the first portion, wherein the recreating includes inserting at least one header into the print job; re-routing, by the service bot, the recreated print job to the identified at least one physically proximate target print device to complete printing of the second portion of the print job; receiving, by the service bot and from the at least one printer bot in the respective at least one physically proximate target print device, a confirmation indicating that the second portion of the print job has completed printing; and notifying, by the service bot, the client terminal that printing of the print job has completed and identifying the at least one physically proximate target print device that printed the second portion.

Various other implementations, alternatives, additions, and refinements are described and claimed herein. A non-transitory computer-readable medium and print device are also provided.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic representations to promote comprehension. The drawings illustrate one or more embodiments of the disclosure, and together with the description, serve to explain the principles and operation of the disclosure.

DETAILED DESCRIPTION

Figure 1:
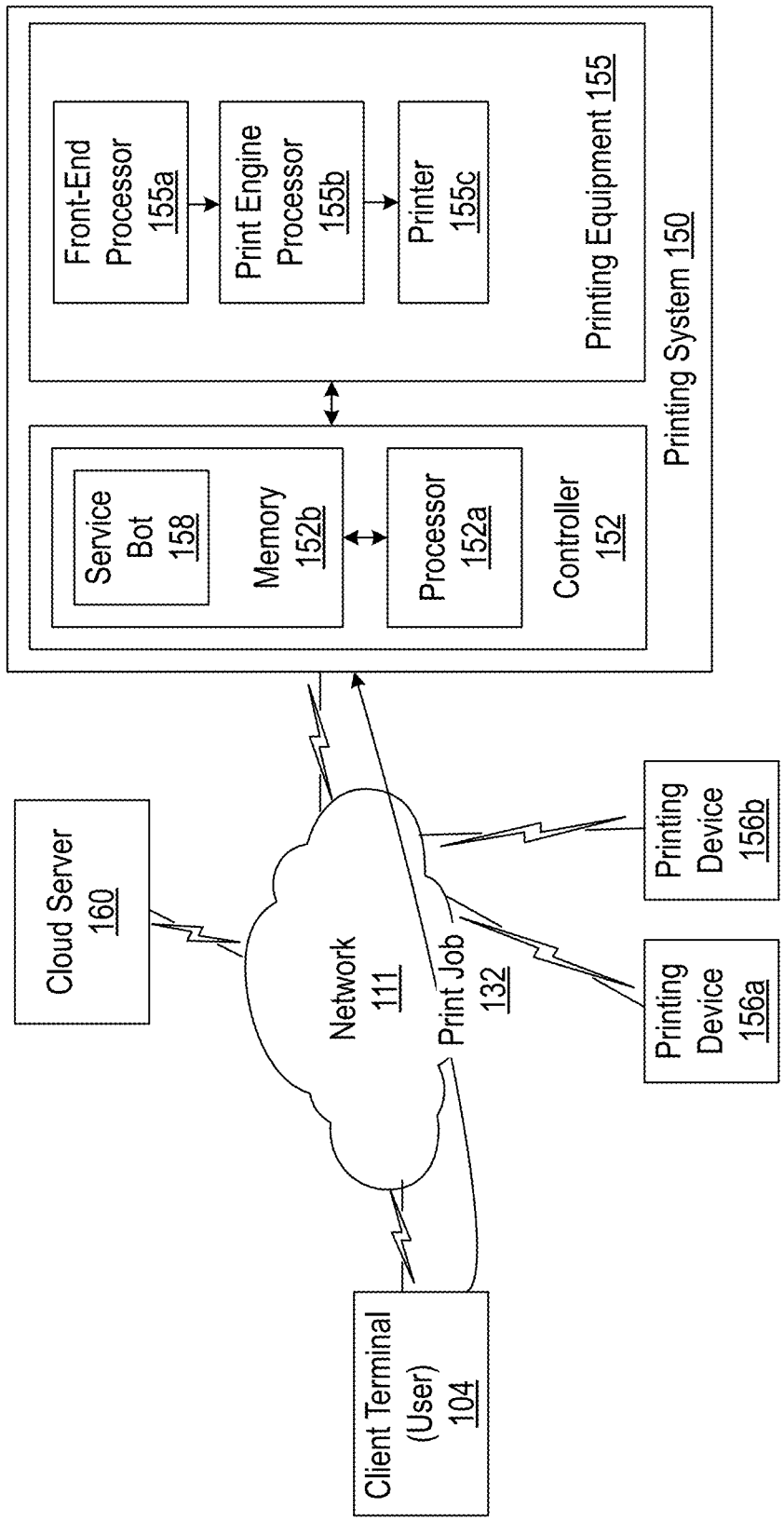
FIG. 1 is a simplified block diagram illustrating an environment that includes various entities that cooperate to facilitate providing improved printing device maintenance and troubleshooting, according to an example embodiment.

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations by use of the antecedent "about," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

To assist in providing improved printing device maintenance and troubleshooting, the presently described technology includes a service bot residing in a printing device, such as a Multi-Function Peripheral (MFP). The service bot assists a user of the printing device in recovering a print job affected by a printing error. More particularly, when a printing error occurs, the service bot in the printing device would perform the following actions: (1) back up and reroute at least a portion of the affected print job to one or more other physically proximate (i.e., nearby) printing devices by communicating with respective service bots associated with the one or more physically proximate printing devices; (2) create a settings profile so that the one or more physically proximate printing devices to which the affected print job was rerouted can adjust print settings without user interaction; (3) troubleshoot and recommend parts to be replaced and/or resolved; and (4) timely notify the user of the printing device of (a) an identified issue and resolution update and (b) printing devices to which the affected print job was rerouted.

Rerouting by the service bot in the printing device differs from typical distributed printing via a host-side print driver that splits a print job and sends portions of the print job to different print devices. The presently described technology uses a service bot in the printing device itself to route a print job that is already in the memory of the printing device. Similarly, troubleshooting and solution recommendations, to the extent available, have typically been performed server-side and/or in the cloud. For example, prior solutions relied on pushing code to an individual printing device for testing, upon a printing error occurring at the printing device. In contrast, for the described embodiments, no reliance is placed on any print driver and/or server for the improved printing device maintenance and troubleshooting methodology set forth herein.

FIG. 1 is a simplified block diagram illustrating an environment 100 that includes various entities that cooperate to provide improved printing device maintenance and troubleshooting, according to an example embodiment. Example entities of the environment 100 can include a client terminal 104 (with which a user may be associated), a printing system 150 (also referred to herein as a print device or printing device), other proximate (i.e., physically nearby to the printing system 150) printing devices 156a and 156b, and a cloud server 160. The various entities of the environment 100 can be configured to communicate with one another via a network 111, such as a Local Area Network (LAN), Wide Area Network (WAN), such as the Internet, or another type of wired or wireless network.

The printing system 150 includes a controller 152 and printing equipment 155, as illustrated in FIG. 1. Each of these will now be described in further detail, with reference to one or more examples.

The controller 152 can include a processor 152a and a memory 152b. The controller 152 can include other subsystems, such as an input/output (I/O) subsystem, for example. The processor 152a is in communication with the memory 152b. The processor 152a is configured to execute instruction code stored in the memory 152b. The instruction code may include a service bot application 158 that facilitates performing, by the controller 152, various functions associated with providing improved printing device maintenance and troubleshooting for the printing system 150. The processor 152a can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system. In addition, the operations performed by the various subsystems can be combined into a fewer or greater number of subsystems to facilitate speed scaling, cost reductions, etc. Further example implementation details of the controller 152 and other computer systems are described with reference to FIG. 5.

In one example, the controller 152 can be configured to coordinate operations performed by the printing equipment 155. For example, the controller 152 can be configured to receive print job requests 132 (also referred to as "print jobs," "print files," and/or "print job files" herein) from entities (e.g., the client terminal 104) outside of the printing system 150 and to communicate the print job requests 132 to the printing equipment 155. As described in more detail below, the controller 152 can be further configured to assist, via the service bot 158, in providing improved printing device maintenance and troubleshooting. The service bot 158 in the controller 152 may communicate with the cloud server 160 (described in further detail with respect to FIG. 2) and printing device(s) 156(a), 156(b), and/or other printing devices to assist in providing such functionality.

In one example, the printing equipment 155 can include a Front-End Processor (FEP) 155a, a Print Engine Processor (PEP) 155b, and one or more printers 155c. The FEP 155a, also referred to as a Digital Front-End (DFE) herein, can be configured to convert bitmap images, vector graphics, fonts, etc., associated with pages specified in the print job request 132 to a bitmap/rasterized representation of the image (e.g., C, M, Y, and K pixels). The manner in which the FEP 155a rasterizes the pages specified in the print job request can depend on various image rasterization parameters of the FEP 155a. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones. Such image rasterization parameters (e.g., color profiles) may be modified based on color calibration performed according to embodiments set forth herein, according to some examples.

In one example, the PEP 155b can be included or in communication with the printer 155c. The printer 155c can, but need not, correspond to an industrial printer, for example, such as one capable of printing thousands of pages an hour. In this regard, the printer 155c can be ink-based, toner-based, or can use a different medium. The PEP 155b can include various parameters that can control the operation of the printer 155c, based on print instructions included in or with the print job request 132.

Figure 2:
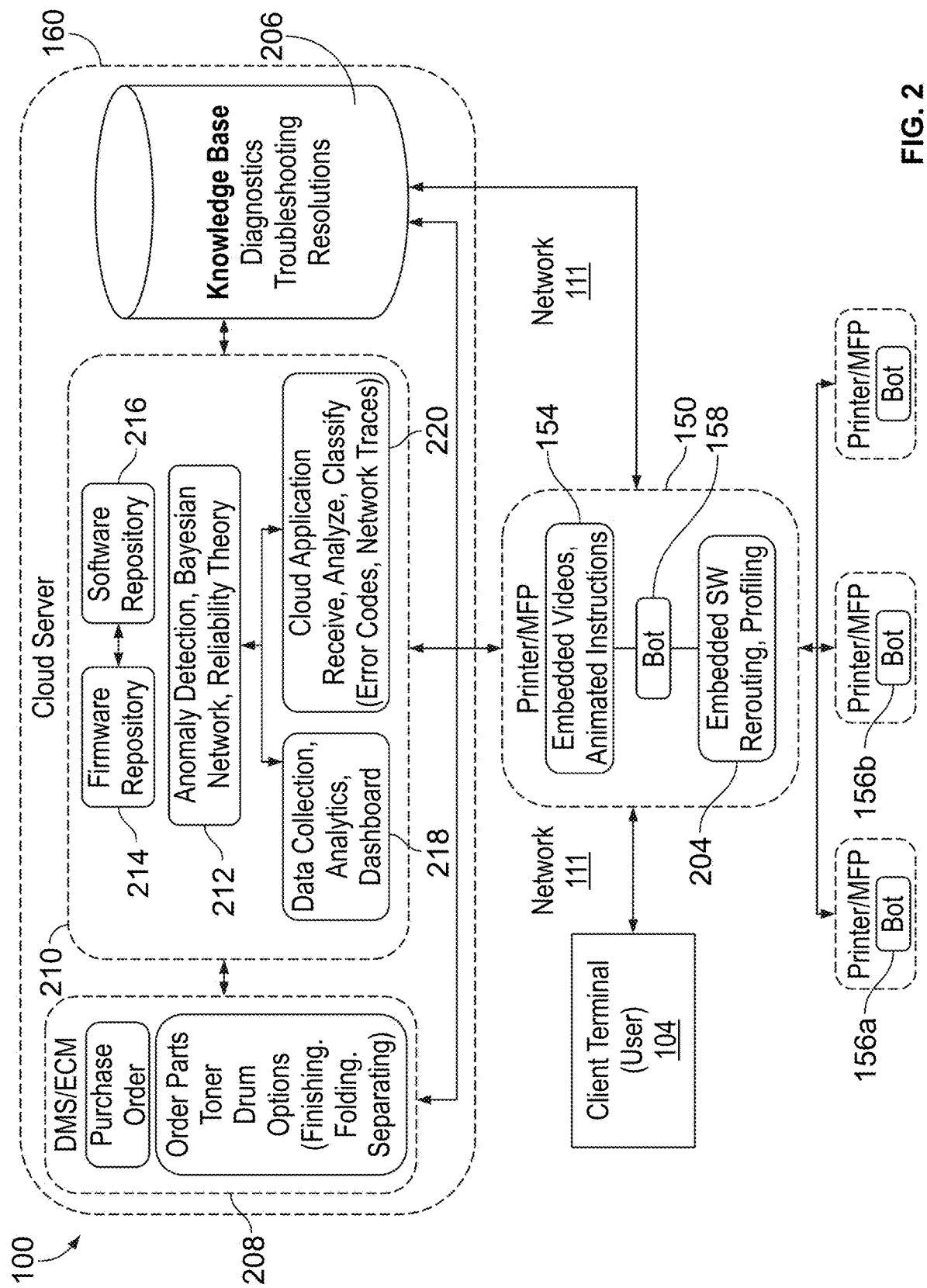
FIG. 2 is a simplified block diagram illustrating the environment of FIG. 1, with additional components cooperating to provide improved printing device maintenance and troubleshooting, according to an example embodiment.
Figure 3:
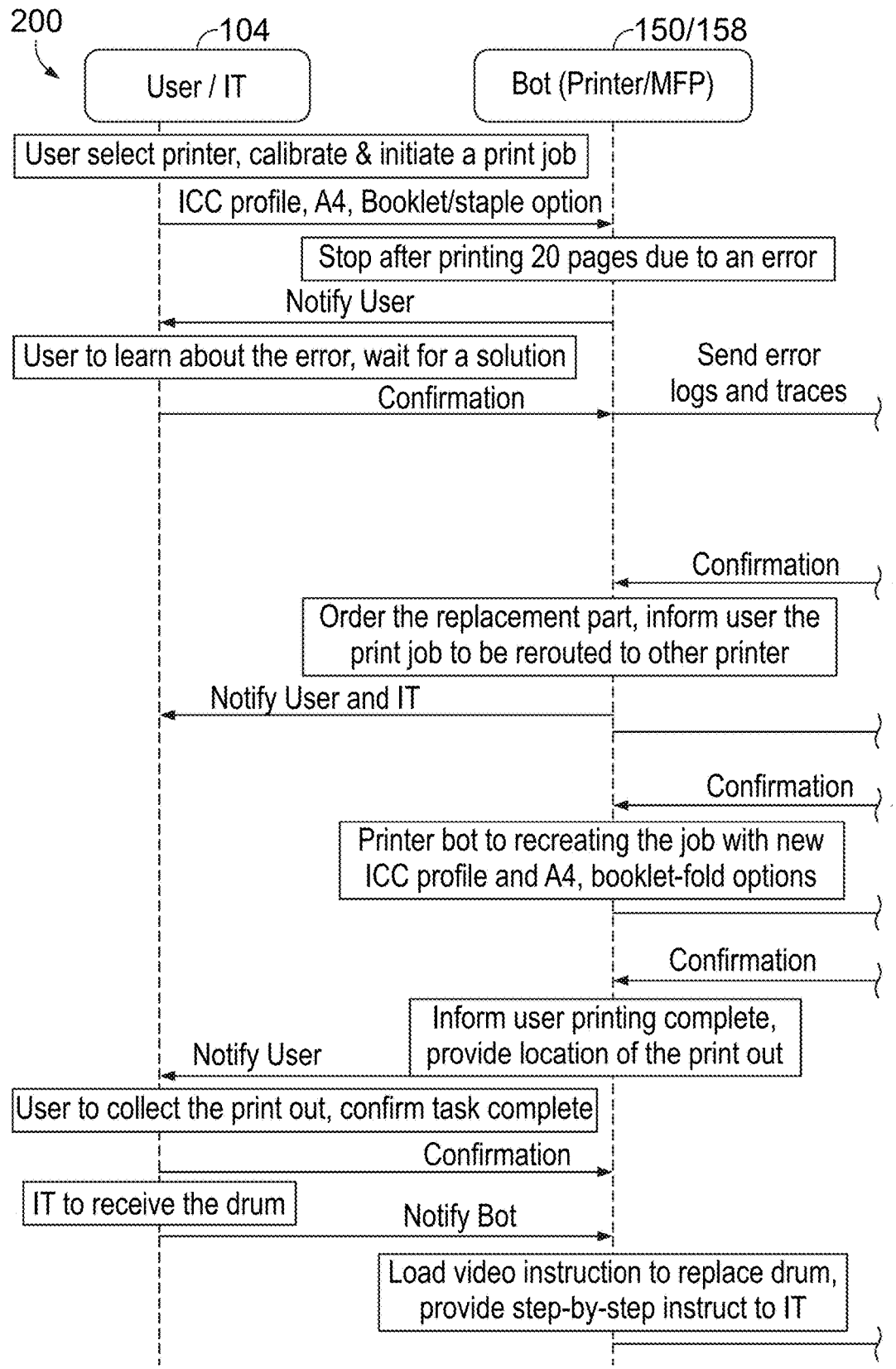
FIG. 3 is a simplified sequence diagram illustrating communications and messaging between various entities that cooperate to facilitate providing improved printing device maintenance and troubleshooting, according to an example embodiment.
Figure 3:
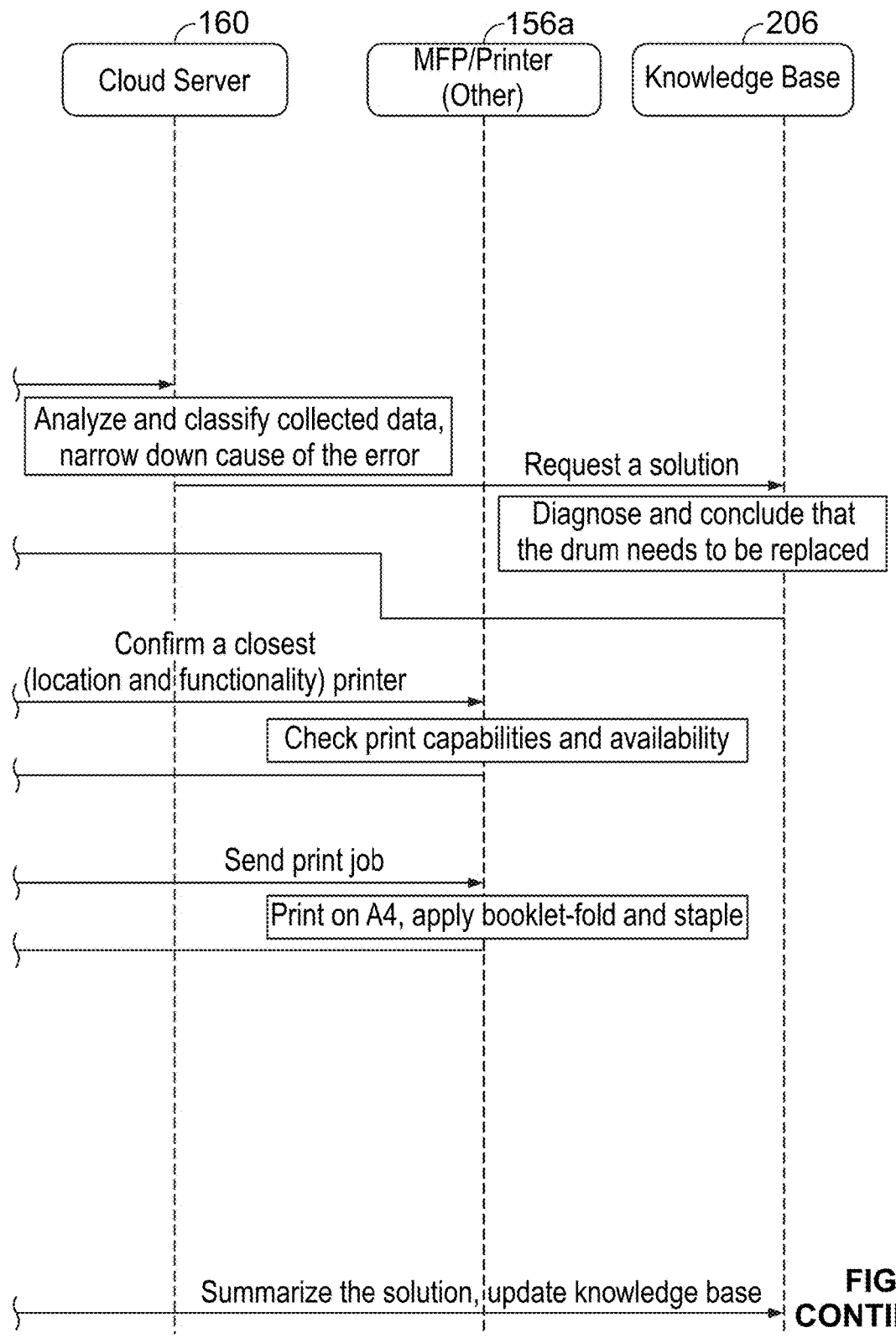

FIG. 2 is a simplified block diagram illustrating the environment 100 of FIG. 1, with additional components cooperating to provide improved printing device maintenance and troubleshooting, according to an example embodiment. FIG. 3 is a simplified sequence diagram illustrating communications and messaging between various entities that cooperate to facilitate providing improved printing device maintenance and troubleshooting, according to an example embodiment. The following discussion references both FIGS. 2 and 3 in stepping through an example sequence that may be used to provide improved printing device maintenance and troubleshooting according to an example embodiment. As shown, components in the environment 100 are connected to other components via the network 111, shown as double-ended arrows between each of the components described below.

The example printing system 150 is illustrated as including the service bot 158, which may be implemented via the processor 152a executing instructions stored in the memory 152b of the controller 152 (see FIG. 1) to act on received inputs and generate corresponding outputs according to one or more logical directives or rules, which may include utilizing anomaly detection, such as via a Bayesian network hosted by the cloud server 160.

The printing system 150 also includes an embedded videos/animated instructions module 154, which may include a media player application stored in memory for playing one or more videos and/or animations on a display screen of the printing system 150 for a maintenance technician servicing the printing device 150. Such videos and/or animations may be retrieved from the cloud server 160, for example. Alternative, the videos and/or animations may be stored locally on the printing system (e.g., in the memory 152b or another storage device) and updated/replaced periodically as needed from the cloud server 160.

The printing system 150 additionally includes an embedded software rerouting/profiling module 204, which may be stored in the memory 152b (see FIG. 1), for example. In some examples, the embedded software rerouting/profiling module 204 may be utilized by the service bot 158 to assist in rerouting portions (including entireties) of a print job 132 to other printing devices 156a, 156b, and/or others. In the illustrated embodiment, each other printing device 156a, 156b, etc., has its own corresponding bot, which may be similar to the service bot 158 or variations thereof. Alternatively, one or more of the printing devices 156a, 156b, and/or others may instead have a printer bot with less functionality than the service bot 158, such as a bot that does not perform troubleshooting and maintenance but instead only facilitates receiving rerouted print jobs 132 from the service bot 158 in the printing system 150. For example, such bots could receive settings information from the bot 158 to be applied to the respective other printing devices 156a, 156b, and/or others.

The example cloud server 160 includes executable software components and/or stored data including at least a knowledge database 206 (including diagnostics, troubleshooting, and resolution components based on accumulated troubleshooting and/or repair data, user community inputs (e.g., via a community technical discussion forum), and/or other information), a parts service 208 (e.g., including a Document Management System (DMS)/Enterprise Content Management (ECM) component to generate purchase orders and order parts, such as toner cartridges, drums, and parts associated with print options, such as finishing, folding, and separating), and a troubleshooting service 210 (e.g., including an anomaly detection module that relies on one or more Bayesian networks and/or reliability theory, for example). The troubleshooting module illustrated in FIG. 2 also includes a firmware repository 214, a software repository 216, a data collection, analytics, and dashboard module 218, and a cloud application 220 (e.g., for receiving, analyzing, and classifying printing errors from the service bot 158, which may include generating one or more error codes and/or network traces, for example). In one example, one or more of the knowledge database 206, the parts service 208, and the troubleshooting service 210 are implemented via or in conjunction with one or more processors (not shown in FIG. 1 or 2 but described with reference to FIG. 5) of the cloud server 160 executing instructions stored in a memory (not shown in FIG. 1 or 2 but described with reference to FIG. 5) of the cloud server 160 to act on received inputs and generate corresponding outputs according to one or more logical directives or rules. Such received inputs and/or generated outputs may be communicated to the service bot 158 in the printing system 150, for example.

According to one example, as illustrated in FIG. 3, the client terminal 104 initiates a print job 132, which may include specifying print options such as selecting a particular print device (e.g., print device/system 150), paper type and size, ink (e.g., color vs. black and white or grayscale), ICC profile, print resolution/quality, post-finishing options (e.g., booklet/staple options), and other parameters. The client terminal 104 sends the print job 132 as a print job request to the print device/system 150.

The print device/system 150 receives the print job 132 from the client terminal 104 and begins printing the print job according to the specified print options. However, in the illustrated example, the print device/system 150 stops after printing only 20 pages (which is less than the entirety of the print job) 132, due to a print error occurring at the print device/system 150. Upon the print error occurring, the service bot 158 in the print device/system 150 notifies the client terminal 104 by transmitting an error notification message, indicating the general nature of the error and informing the client terminal that a resolution is being sought by the service bot 158. The client terminal 104 confirms receipt of the error notification message by transmitting an acknowledgement message back to the service bot 158 in the print device/system 150.

The service bot 158 sends error log(s) and/or trace(s) to the cloud server 160 to begin the troubleshooting/resolution process. The cloud server 160 analyzes and classifies the collected data (including the error log(s) and/or trace(s) and information about the print device/system 150 (e.g., model, firmware version, etc.)) to attempt to narrow down the potential cause of the error, such as by utilizing one or more of an anomaly detection component, a Bayesian network, and/or reliability theory, any or all of which may utilize historical error data, manufacturer specifications, or other data. Such data may be cleaned, parsed, or analyzed using machine learning or other algorithms, for example.

The cloud server 160, upon narrowing the potential cause of the print error, requests a corresponding solution to the narrowed-down error by transmitting a request message to the knowledge database 206. For example, as illustrated, the knowledge database 206 may utilize a database lookup algorithm to determine that a probable resolution to the narrowed-down error is replacement of the drum in the print device/system 150. The knowledge database 206 can transmit a resolution confirmation message to the service bot 158 in the print device/system 150 indicating the error resolution (replacement of the drum).

Upon receiving the error resolution, the service bot 158 can order the replacement part (i.e., a new drum in the illustrated example), such as by utilizing the parts service 208 in the cloud server 160. The service bot 159 then notifies the client terminal 104 (which may include notifying a user or the client terminal 104 and/or others, such as IT personnel).

Meanwhile, the service bot 158 identifies a physically proximate print device (or multiple such print devices) to which the uncompleted print job 132 can be re-routed. For example, the service bot 158 may utilize one or more network discovery protocols, print device databases/tables (e.g., local or hosted by the cloud server 160), or via another technique. In the illustrated example, the service bot 158 identifies other print device 156a (i.e., a target print device 156a) as a physically proximate print device that is a candidate for re-routing the uncompleted print job 132 to. The service bot 158 communicates with a bot in the target print device 156a to determine print capabilities (e.g., options/settings) and availability of the target print device 156a. The bot in the target print device 156a sends a confirmation message back to the service bot 158 in the print device/system 150 confirming print capabilities of the target print device 156a. Upon determining that the print capabilities of the target print device 156a are suitable/acceptable (e.g., would result in a similar print output as the print output started by the print device/system 150 for the print job 132), the service bot 158 recreates the print job 132 for printing on the target print device 156a. Recreating the print job 132 may include altering the print job by inserting a new ICC profile, paper size (e.g., A4), and post-finishing options (e.g., booklet-fold), for example, and may include removing already-printed pages (e.g., the first 20 pages, in the illustrated example) and adjusting print job headings/footers/fields as appropriate. The service bot 158 in the print device/system 150 then transmits the recreated print job 132 to the bot in the target print device 156a.

Upon receiving the recreated print job 132 from the service bot 158 in the print device/system 150, the target print device 156a proceeds to print the print job 132 according to the specified options/settings in the recreated print job 132: e.g., A4 paper, booklet-fold, and staple. The bot in the target print device 156a, upon completing printing of the recreated print job 132, then transmits a print confirmation message to the service bot 158 in the print device/system 150, so that the service bot 158 can transmit a notification message to the client terminal 104 to notify the user that the printing of the print job 132 is complete and indicating where (i.e., at which print device(s)) the print output of the completed print job 132 can be retrieved. The user can then cause the client terminal 104 to notify the service bot 158 that the print output has been retrieved, thereby completing the task.

Meanwhile, once the ordered drum has been received, such as by an IT administrator associated with the print device/system 150, the service bot 158 can be notified (e.g., via a transmitted received-part notification message from the IT administrator's workstation). The service bot 158 can then load video instructions for viewing on a display of the print device/system 150, to assist a technician in installing the new drum in the print device/system 150. For example, loading video instructions may include retrieving an up-to-date technical video from the cloud server 160, to be played on a media player in the print device/system 150 once the technician arrives to replace the drum. The service bot 158 can then transmit a solution summary message to the knowledge database 206 to update/augment/enrich the knowledge database 206 for future troubleshooting and maintenance resolution.

Figure 4:
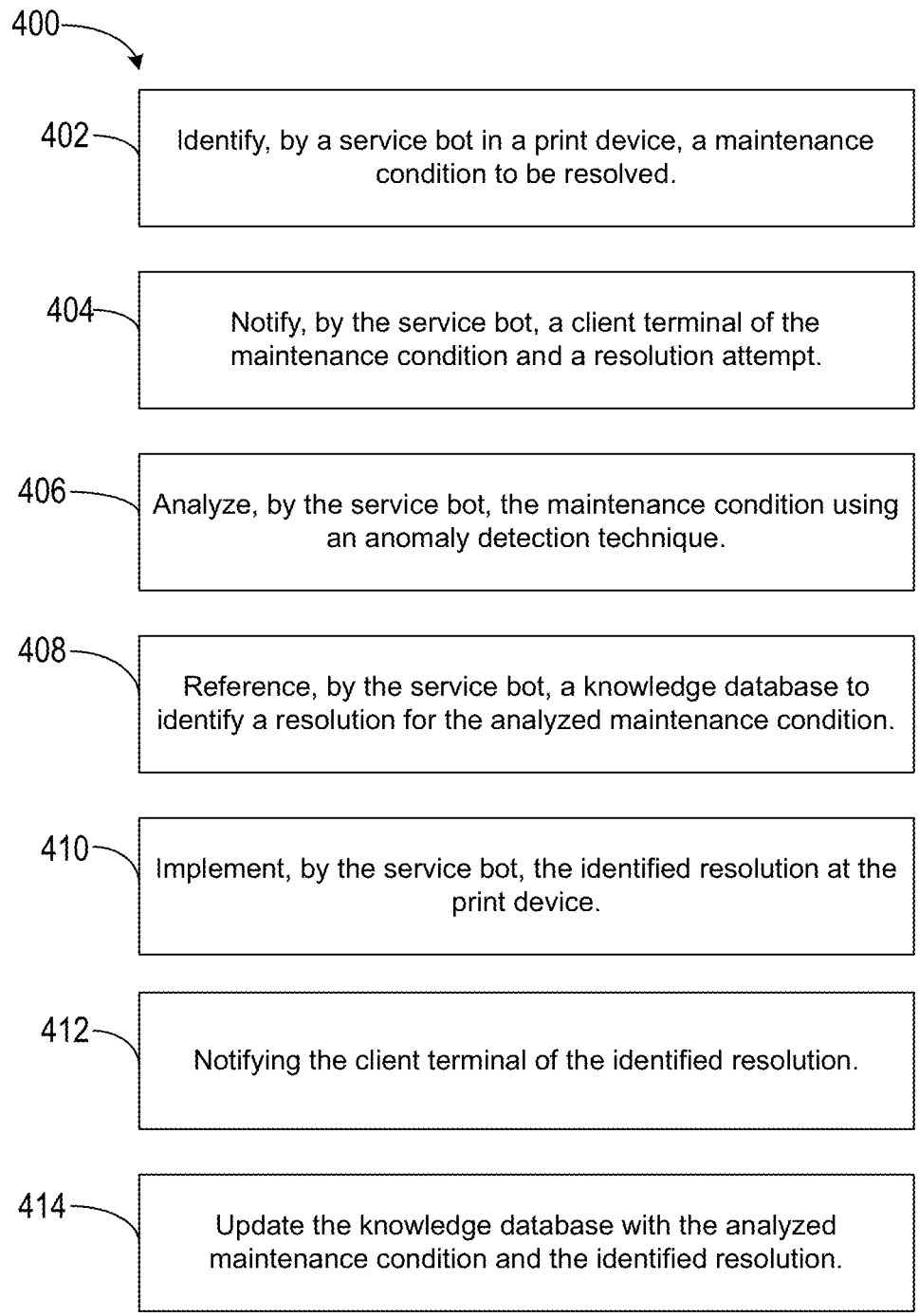
FIG. 4 is a flow diagram illustrating a method for providing improved printing device maintenance and troubleshooting, according to an example embodiment.

FIG. 4 is a flow diagram illustrating a method 400 for improved printing device maintenance and troubleshooting, according to an example embodiment. The method 400 and variations (see the examples set forth in the following description) could be a series or plurality of functions performed by service bot implemented by a processor executing instructions stored on a non-transitory computer-readable medium, as described with respect to FIG. 5, for example. For example, the method 400 could be performed, at least in part, at a printing device having a print controller with at least one processor and a non-transitory computer-readable medium having instructions stored therein to cause the at least one processor to perform functions associated with the method 400, including variations thereof.

In block 402, the method 400 involves identifying, by a service bot in a print device, a maintenance condition to be resolved. As discussed above, the service bot may comprise a processor executing instructions stored on a computer-readable medium in the print device. The maintenance condition may be one of the following, without limitation, for example: a printing error, a part to be replaced, a part to be repaired, firmware to be updated, or software to be updated.

In block 404, the method 400 involves notifying, by the service bot, a client terminal of the maintenance condition and a resolution attempt. This may include transmitting a notification message via a network connection, for example.

In block 406, the method 400 involves analyzing, by the service bot, the maintenance condition using an anomaly detection technique. This may include, for example, inputting data associated with the identified maintenance condition into at least one of the following: a cloud-hosted Bayesian network model, a local Bayesian network model, a cloud-hosted reliability theory model, or a local reliability theory model.

In block 408, the method 400 involves referencing, by the service bot, a knowledge database to identify a resolution for the analyzed maintenance condition.

In block 410, the method 400 involves implementing, by the service bot, the identified resolution at the print device. This may include, for example, the service bot downloading and installing a firmware update or software update for the print device and notifying the client terminal that the print device will be unavailable until the firmware update or software update for the print device has been downloaded and installed onto the print device. As another example, this may include the service bot ordering a part for the print device and notifying the client terminal that the print device will be unavailable until the ordered part is received and installed. In addition, the service bot may (a) receive an indication that the ordered part has been received, (b) download instructions for installing the ordered part on the print device, and (c) output the instructions to a technician via a user interface on the print device. For example, if the instructions comprise an installation video downloaded by the service bot from a cloud repository, then outputting the instructions to the technician may include playing a portion of the installation video on a display screen of the print device and pausing the installation video after the portion of the installation video has been played until prompted by the technician to resume playing the installation video.

In block 412, the method 400 involves notifying the client terminal of the identified resolution. This may include transmitting a notification message via a network connection, for example.

In block 414, the method 400 involves updating the knowledge database with the analyzed maintenance condition and the identified resolution. This may make future resolution of maintenance conditions more efficient and reliable/effective.

The method 400, according to another embodiment, may additionally include: receiving, at the print device and from the client terminal, a print job including settings for the print job; printing, by the print device, a first portion of the print job comprising less than an entirety of the print job; identifying, by the service bot, the maintenance condition, wherein the maintenance condition is a printing error that prevents completion of the printing of the entirety of the print job; identifying, by the service bot, at least one physically proximate target print device having printing capabilities suitable to realize the settings included in the print job, wherein the identifying includes the service bot communicating with at least one printer bot respectively associated with the at least one physically proximate target print device to determine the printing capabilities and availability for printing; recreating, by the service bot, the print job to include a second portion of the print job comprising a remainder of the print job not included in the first portion, wherein the recreating includes inserting at least one header into the print job; re-routing, by the service bot, the recreated print job to the identified at least one physically proximate target print device to complete printing of the second portion of the print job; receiving, by the service bot and from the at least one printer bot in the respective at least one physically proximate target print device, a confirmation indicating that the second portion of the print job has completed printing; and notifying, by the service bot, the client terminal that printing of the print job has completed and identifying the at least one physically proximate target print device that printed the second portion.

To illustrate application of the above-described technology for improved printing device maintenance and troubleshooting, two example use cases are set forth below. The first example use case involves re-routing a print job when a print error happens, while troubleshooting the error and apply a necessary solution (similar to as illustrated in FIG. 3). The second example use case involves performing predictive maintenance to "tune-up" a printing device, such as an MFP.

In the first example use case (re-routing a print job when a print error happens, while troubleshooting the error and apply a necessary solution), a user prints a document (i.e., a print job 132) from a PC (an example of a client terminal 104) and the printer/MFP (e.g., print device/system 150) encounters an error and stops printing. The service bot 158 detects the error and notifies the user regarding this failure and also informs user that the issue is under investigation and will notify once it is resolved.

The service bot 158 analyzes the failure based on the error code and confirms that it requires a firmware update. The service bot 158 looks into the logs and analyzes the issue by using a Bayesian network model (one of the Anomaly Detection techniques provided at the client server 160) to predict the likelihood that any one of several possible known causes was the contributing factor. Then, the service bot 158 (e.g., via the cloud server 160) searches through the knowledge database 206 using key words that describe the known cause and determines that a similar issue had been fixed in a recent firmware update. Since the proposed firmware update requires some time to download, install, and reboot, the service bot 158 decides (e.g., based on a threshold time being exceeded) to reroute the print job 132 to other printer while recovering the printing.

The service bot 158 communicates with other bots located in nearby (physically proximate) printers/MFPs to find a closest match (a device that has similar device capabilities) and use that printer/MFP as a target for rerouting. Before rerouting the print job, service bot 158 communicates with the print software on the PC (i.e., client terminal 104) and retrieves the settings profile. The setting profile may include selected media (paper type), finishing options (staple, punch, folding, booklet, etc.), and ICC profile that is generated by color calibration. For production printing, for example, the ICC profile depends on the ink, paper, and color matching; from time to time, the ICC profile may differ from one printer to another even though they are exactly the same printer model.

If settings profile matches with the target printer/MFP's 156a settings, the service bot 158 directly forwards the remaining print job 132 to the target printer 156a by inserting the job/page headers to make it a complete recreated print job 132. In particular, typically a print job contains multiple headers:

Start Doc
        Start Job
            Start Page
            . . .
            End Page
            Start Page
            . . .
            End Page
            . . .
        End Job
    End Doc Assuming the error happened after printing 20 out of 100 pages, re-routing the print job to the other printer 156a means that the remaining portion of the print job (page 21 to page 100) needs to be wrapped with proper headers so that it can be printed properly in target printer 156a. Otherwise, another print error may happen due to incomplete job formatting.

If settings profile does not match with a target printer/MFP's 156a settings (ICC profile, in this example), then the service bot 158 informs the print software on the PC to adjust the settings profile (ICC profile). The service bot 158 sends the adjusted ICC profile settings to the target print device 156a so that the print quality matches with the first 20 pages' print quality. This way the user is provided with a consistent color quality throughout the entire 100 pages of the complete print job 132. This saves time and resources (paper, ink) by avoiding unnecessary duplicated prints. After the print job rerouting process is complete, the service bot 158 informs the user to collect the remaining printout (i.e., pages 21-100) from the target printer/MFP 156a.

Meanwhile, the service bot 158 downloads the latest firmware versions from a cloud firmware repository hosted at the cloud server 160 and upgrades the source printer 150 (i.e., the printer with the failure/error). Once the firmware upgrading is complete, the service bot 158 reboots the printer/MFP 150 and resets it to a factory default state, for example. Once the printer/MFP 150 is back up and running, the service bot 158 informs the user that the printer/MFP 150 is fixed and ready for printing future print jobs.

The service bot 158 also updates the knowledge database 206 with the implemented solution and documents the key details in the knowledge database 206. Then, that information can be used in the Bayesian network model in the cloud server 160 for future troubleshooting and reference. The service bot 158 completes the troubleshooting task and stays in maintenance mode, awaiting future print errors and/or performing periodic maintenance based on time and/or other sensed conditions (e.g., number of prints). This maintenance mode is described in the second example use case.

In the second example use case (Printer/MFP tune-up (predictive maintenance)), while printer/MFP 150 stays idle, the service bot 158 consistently carries out a tune-up (predictive maintenance) process. This would help using the printer/MFP 150 to operate efficiently with minimized downtime. In particular, the service bot 158 checks each software component (network, firmware, Raster Image Processor (RIP), etc.) on the printer 150 one-by-one and keeps them up-to-date by comparing the current versions with the latest versions that are available in a cloud-based software repository (e.g., hosted by the cloud service 160).

The service bot 158 checks the usage of each print device 150 part (engine, drum, finisher, toner, etc.), such as by using a Bayesian network model (one of than example of an anomaly detection technique) to predict if any device part requires replacement. The Bayesian network model may be hosted in the cloud server 160 or another location. The service bot 158 determines the lifetime of device parts using reliability theory, for example. Reliability theory concerns itself with the probability distribution of the time a component or machine will operate before failing.

For example, assume that the service bot 158 analyzed and concluded that the Cyan toner in the print device 150 is about to reach the threshold toner level. The service bot 158 sends a purchase order request to the parts service 208 (e.g., a DMS/ECM workflow system) and sets the due date for delivery. Once the replacement part shipment arrives, the service bot 158 is notified, such as by the parts service 208 in the cloud server 160. The service bot 158 sends an installation request to a technician and schedules the installation. The service bot 158 notifies historical and/or enabled users of the print device 150 that the print device 150 will be unavailable during a certain time period for maintenance. Meanwhile, the service bot 158 downloads a replacement instruction video from a cloud-based repository (e.g., hosted by the cloud server 160) and keeps it ready to play in a media player on the print device 150. When technician arrives at the print device 150 at the scheduled time, the service bot greets the technician and starts providing the step-by-step instructions by playing the replacement instruction video. In one example, the service bot 158 can read aloud instructions from an installation manual and pause between installation steps until told by the technician to continue.

The service bot 158 may advantageously be provided with a rechargeable battery, to allow it to continue to operate when the technician powers-off the print device 150 during parts installation. In addition, for certain steps, the service bot 158 may play the video on a display panel of the print device 150 for better illustration. The technician may ask (e.g., via typing prompts into a touchscreen or keypad or via voice recognition in the service bot 158) the service bot 158 to replay or pause the installation video as necessary.

The above-described use cases are merely examples and are not intended to limit the scope of the technology's application.

Figure 5:
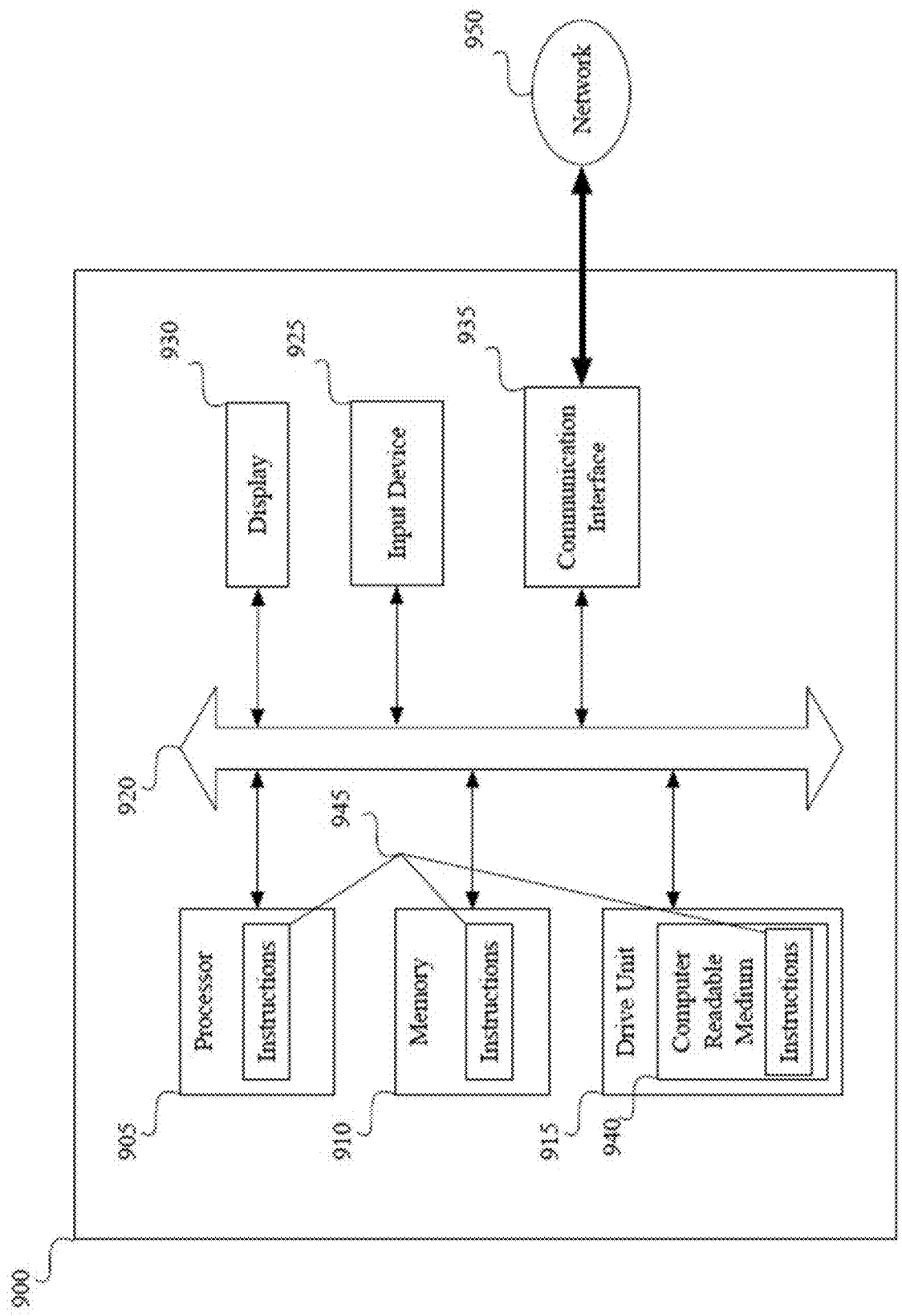
FIG. 5 is a simplified block diagram illustrating an example computer system that may be utilized in one or more example embodiments.

FIG. 5 is a simplified block diagram illustrating an example computer system 900 that may be utilized in one or more example embodiments. The computer system 900 can form part of or implement any of the systems and/or devices described above. The computer system 900 can include a set of instructions 945 that the processor 905 can execute to cause the computer system 900 to perform any of the operations described above. The computer system 900 can operate as a stand-alone device or can be connected, e.g., using a network, to other computer systems or peripheral devices, for example.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, a hard disk drive, or any other type of memory or storage device.

The computer system 900 can include a display 930, such as a light-emitting diode (LED) display, liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touchscreen, configured to allow a user to interact with components of system 900.

The computer system 900 can also include a disk or an optical or solid-state drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media as discussed above.

The computer system 900 can include a communication interface 935 to support communications via a network 950. The network 950 can include wired networks, wireless networks, or combinations thereof. The communication interface 935 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. "Computer program" as used herein refers to an expression, in a machine-executable language, code or notation, of a set of machine-executable instructions intended to cause a device to perform a particular function, either directly or after one or more of (a) conversion of a first language, code, or notation to another language, code, or notation; and (b) reproduction of a first language, code, or notation. Such a computer program may be stored as instructions in a non-transitory computer-readable medium, for example.

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated by reference for all purposes.

What is claimed is:

1. A method comprising:
   identifying, by a service bot in a print device, a maintenance condition to be resolved, wherein the service bot comprises a processor executing instructions stored on a computer-readable medium in the print device;
   notifying, by the service bot, a client terminal of the maintenance condition and a resolution attempt;
   analyzing, by the service bot, the maintenance condition using an anomaly detection technique;
   referencing, by the service bot, a knowledge database to identify a resolution for the analyzed maintenance condition;
   implementing, by the service bot, the identified resolution at the print device;
   notifying the client terminal of the identified resolution;
   updating the knowledge database with the analyzed maintenance condition and the identified resolution;
   receiving, at the print device and from the client terminal, a print job including settings for the print job;
   printing, by the print device, a first portion of the print job comprising less than an entirely of the print job;
   identifying, by the service bot, the maintenance condition, wherein the maintenance condition is a printing error that prevents completion of the printing of the entirety of the print job;
   identifying, by the service bot, at least one physically proximate target print device having printing capabilities suitable to realize the settings included in the print job, wherein the identifying includes the service bot communicating with at least one printer bot respectively associated with the at least one physically proximate target print device to determine the printing capabilities and availability for printing;
   recreating, by the service bot, the print job to include a second portion of the print job comprising a remainder of the print job not included in the first portion, wherein the recreating includes inserting at least one header into the print job;
   re-routing, by the service bot, the recreated print job to the identified at least one physically proximate target print device to complete printing of the second portion of the print job;
   receiving, by the service bot and from the at least one printer bot in the respective at least one physically proximate target print device, a confirmation indicating that the second portion of the print job has completed printing; and
   notifying, by the service bot, the client terminal that printing of the print job has completed and identifying, the at least one physically proximate target print device that printed the second portion.

2. The method of claim 1, wherein implementing, by the service bot, the identified resolution at the print device comprises the service bot downloading and installing a firmware update or software update for the print device, and wherein notifying the client terminal of the identified resolution comprises notifying the client terminal that the print device will be unavailable until the firmware update or software update for the print device has been downloaded and installed onto the print device.

3. The method of claim 1, wherein the maintenance condition additionally comprises at least one of the following: a part to be replaced, a part to be repaired, firmware to be updated, or software to be updated.

4. The method of claim 1, wherein analyzing, by the service bot, the maintenance condition using an anomaly detection technique comprises inputting data associated with the identified maintenance condition into at least one of the following: a cloud-hosted Bayesian network model, a local Bayesian network model, a cloud-hosted reliability theory model, or a local reliability theory model.

5. A method comprising:
identifying, by a service bot in a print device, a maintenance condition to be resolved, wherein the service bot comprises a processor executing instructions stored on a computer-readable medium in the print device;
notifying, by the service bot, a client terminal of the maintenance condition and a resolution attempt;
analyzing, by the service bot, the maintenance condition using an anomaly detection technique;
referencing, by the service bot, a knowledge database to identify a resolution for the analyzed maintenance condition;
implementing, by the service bot, the identified resolution at the print device,
wherein implementing, by the service bot, the identified resolution at the print device comprises:
the service bot ordering a part for the print device;
receiving, by the service bot, an indication that the ordered part has been received;
downloading, by the service bot, instructions for installing the ordered part on the print device;
outputting, by the service bot, the instructions to a technician via a user interface on the print device;
notifying the client terminal of the identified resolution, wherein notifying the client terminal of the identified resolution comprises notifying the client terminal that the print device will be unavailable until the ordered part is received and installed; and
updating the knowledge database with the analyzed maintenance condition and the identified resolution.

6. The method of claim 5, wherein the instructions comprise an installation video downloaded by the service bot from a cloud repository and wherein outputting, by the service bot, the instructions to the technician comprises:
playing a portion of the installation video on a display screen of the print device; and
pausing the installation video after the portion of the installation video has been played until prompted by the technician to resume playing the installation video.

7. A non-transitory computer-readable medium having instructions stored therein to cause at least one processor to perform functions to act as a service bot in a print device, the functions comprising:
identifying, by the service bot in the print device, a maintenance condition to be resolved;
notifying, by the service bot, a client terminal of the maintenance condition and a resolution attempt;
analyzing, by the service bot, the maintenance condition using an anomaly detection technique;
referencing, by the service bot, a knowledge database to identify a resolution for the analyzed maintenance condition;
implementing, by the service bot, the identified resolution at the print device;
notifying the client terminal of the identified resolution; and
updating the knowledge database with the analyzed maintenance condition and the identified resolution;
receiving, at the print device and from the client terminal, a print job including settings for the print job;
printing, by the print device, a first portion of the print job comprising less than an entirety of the print job;
identifying, by the service bot, the maintenance condition, wherein the maintenance condition is a printing error that prevents completion of the printing of the entirety of the print job;
identifying, by the service bot, at least one physically proximate target print device having printing capabilities suitable to realize the settings included in the print job, wherein the identifying includes the service bot communicating with at least one printer bot respectively associated with the at least one physically proximate target print device to determine the printing capabilities and availability for printing;
recreating, by the service bot, the print job to include a second portion of the print job comprising a remainder of the print job not included in the first portion, wherein the recreating includes inserting at least one header into the print job;
re-routing, by the service bot, the recreated print job to the identified at least one physically proximate target print device to complete printing of the second portion of the print job;
receiving, by the service bot and from the at least one printer bot in the respective at least one physically proximate target print device, a confirmation indicating, that the second portion of the print job has completed printing; and
notifying, by the service bot, the client terminal that printing of the print job has completed and identifying the at least one physically proximate target print device that printed the second portion.

8. The non-transitory computer-readable medium of claim 7, wherein the function of implementing, by the service bot, the identified resolution at the print device comprises the service bot downloading and installing a firmware update or software update for the print device, and wherein notifying the client terminal of the identified resolution comprises notifying the client terminal that the print device will be unavailable until the firmware update or software update for the print device has been downloaded and installed onto the print device.

9. The non-transitory computer-readable medium of claim 7, wherein the function of implementing, by the service bot, the identified resolution at the print device comprises the service bot ordering a part for the print device, and wherein notifying the client terminal of the identified resolution comprises notifying the client terminal that the print device will be unavailable until the ordered part is received and installed.

10. The non-transitory computer-readable medium of claim 9, wherein the function of implementing, by the service bot, the identified resolution further comprises the following functions:
receiving, by the service bot, an indication that the ordered part has been received; downloading, by the service bot, instructions for installing the ordered part on the print device; and
outputting, by the service bot, the instructions to a technician via a user interface on the print device.

11. The non-transitory computer-readable medium of claim 10, wherein the instructions comprise an installation video downloaded by the service bot from a cloud repository and wherein the function of outputting, by the service bot, the instructions to the technician comprises the following functions:
- playing a portion of the installation video on a display screen of the print device; and
- pausing the installation video after the portion of the installation video has been played until prompted by the technician to resume playing the installation video.

12. The non-transitory computer-readable medium of claim 7, wherein the maintenance condition additionally comprises at least one of the following: a part to be replaced, a part to be repaired, firmware to be updated, or software to be updated.

13. The non-transitory computer-readable medium of claim 7, wherein analyzing, by the service bot, the maintenance condition using an anomaly detection technique comprises inputting data associated with the identified maintenance condition into at least one of the following: a cloud-hosted Bayesian network model, a local Bayesian network model, a cloud-hosted reliability theory model, or a local reliability theory model.

14. A print device, comprising:
- printing equipment comprising a front-end processor, a print engine processor, and a printer, and
- a controller having a processor to execute instructions stared in a memory, the instructions executable by the processor to implement a service bot that performs functions including:
  - identifying, by the service bot, a maintenance condition associated with the print device to be resolved;
  - notifying, by the service bot, a client terminal of the maintenance condition and a resolution attempt;
  - analyzing, by the service bot, the maintenance condition using an anomaly detection technique;
  - referencing, by the service bot, a knowledge database to identify a resolution for the analyzed maintenance condition;
  - implementing, by the service bot, the identified resolution at the print device;
  - notifying the client terminal of the identified resolution;
  - updating the knowledge database with the analyzed maintenance condition and the identified resolution;
  - receiving, at the print device and from the client terminal, a print job including settings for the print job;
  - printing, by the print device, a first portion of the print job comprising less than an entirety of the print job;
  - identifying, by the service bot, the maintenance condition, wherein the maintenance condition is a printing error that prevents completion of the printing of the entirety of the printing job;
  - identifying, by the service bot, at least one physically proximate target print device having printing capabilities suitable to realize the settings included in the print job, wherein the identifying includes the service bot communicating with at least one printer bot respectively associated with the at least one physically proximate target print device to determine the printing capabilities and availability for printing;
  - recreating, by the service bot, the print job to include a second portion of the print job comprising a remainder of the print job not included in the first portion, wherein the recreating includes inserting at least one header into the print job;
  - re-routing, by the service bot, the recreated print job to the identified at least one physically proximate target print device to complete printing of the second portion of the print job;
  - receiving, by the service bot and from the at least one printer bot in the respective at least one physically Proximate target print device, a confirmation indicating that the second portion of the print job has completed printing; and
  - notifying, by the service bot, the client terminal that printing of the print job has completed and identifying the at least one physically proximate target print device that printed the second portion.

15. The print device of claim 14, wherein the maintenance condition additionally comprises at least one of the following: a part to be replaced, a part to be repaired, firmware to be updated, or software to be updated.

16. The print device of claim 14, wherein the function of analyzing, by the service bot, the maintenance condition using an anomaly detection technique comprises inputting data associated with the identified maintenance condition into at least one of the following: a cloud-hosted Bayesian network model, a local Bayesian network model, a cloud-hosted reliability theory model, or a local reliability theory model.

* * * * *